United States Patent
Song et al.

(10) Patent No.: US 12,190,600 B2
(45) Date of Patent: Jan. 7, 2025

(54) DASH CAM HAVING ANTI-THEFT FUNCTION AND ANTI-THEFT SYSTEM FOR DASH CAM

(71) Applicant: BG T&A CO., Gunpo-si (KR)

(72) Inventors: Chi Hyung Song, Yongin-si (KR); Cheol Jin Park, Ansan-si (KR)

(73) Assignee: BG T&A CO., Gunpo-si (KR)

( * ) Notice: Subject to any disclaimer, the term of this patent is extended or adjusted under 35 U.S.C. 154(b) by 32 days.

(21) Appl. No.: 18/335,596

(22) Filed: Jun. 15, 2023

(65) Prior Publication Data

US 2023/0419677 A1   Dec. 28, 2023

(30) Foreign Application Priority Data

Jun. 22, 2022  (KR) .......................... 10-2022-0076202

(51) Int. Cl.
| | |
|---|---|
| G06V 20/56 | (2022.01) |
| G06V 10/56 | (2022.01) |
| G06V 20/59 | (2022.01) |
| G08B 13/196 | (2006.01) |
| H04N 23/667 | (2023.01) |

(52) U.S. Cl.
CPC .............. *G06V 20/56* (2022.01); *G06V 10/56* (2022.01); *G06V 20/59* (2022.01); *G08B 13/19647* (2013.01); *H04N 23/667* (2023.01)

(58) Field of Classification Search
CPC ...................................................... G06V 20/56
See application file for complete search history.

(56) References Cited

U.S. PATENT DOCUMENTS

2015/0170505 A1   6/2015   Frew et al.

FOREIGN PATENT DOCUMENTS

| CN | 109461276 A | 3/2019 |
|---|---|---|
| KR | 10-2018-0090521 A | 8/2018 |
| WO | 2015/032397 A1 | 3/2015 |

OTHER PUBLICATIONS

The Extended European Search Report for European Patent Application No. 23178962.9, dated Nov. 7, 2023.

*Primary Examiner* — Young Lee (57) ABSTRACT

A dash cam having an anti-theft function includes an image acquisition unit configured to capture an image, a housing, in which the image acquisition unit is built in, mounted inside a vehicle so that the image acquisition unit images a space including at least a portion of a part constituting the vehicle, an image storage unit configured to store a first image and a second image captured by the image acquisition unit, an image analysis unit configured to compare the first image with the second image and determine whether the vehicle in which the housing is mounted has been changed, and a theft signal output unit configured to output a preset theft occurrence signal based on a determination that the vehicle has been changed by the image analysis unit.

6 Claims, 4 Drawing Sheets

DASH CAM HAVING ANTI-THEFT FUNCTION AND ANTI-THEFT SYSTEM FOR DASH CAM

CROSS-REFERENCE TO RELATED APPLICATIONS

This application claims the benefit of Korean Patent Application No. 10-2022-0076202, filed on Jun. 22, 2022, the contents of which are all hereby incorporated by reference herein in their entirety.

TECHNICAL FIELD

The present disclosure relates to a dash cam having an anti-theft function and an anti-theft system for the dash cam.

BACKGROUND

A dash cam (or black box) is a type of recording device installed inside a vehicle and configured to record the surroundings of the vehicle. Generally, dash cams are installed to record a situation in front of vehicles. For example, dash cams may be installed on a dashboard, room mirror and/or front window.

Since the dash cam is installed in a vehicle for the purpose thereof, the dash cam is always exposed to the risk of theft. In particular, dash cam models that are easy to attach and detach have recently appeared, and these models are more vulnerable to theft.

SUMMARY

The present disclosure provides a dash cam having an anti-theft function.

The present disclosure also provides an anti-theft system for a dash cam.

The tasks of the present disclosure are not limited to the tasks mentioned above, and other tasks not mentioned will be clearly understood by those skilled in the art from the following description.

In an aspect, a dash cam having an anti-theft function includes: an image acquisition unit configured to capture an image; a housing, in which the image acquisition unit is built in, mounted inside a vehicle so that the image acquisition unit images a space including at least a portion of a part constituting the vehicle; an image storage unit configured to store a first image and a second image captured by the image acquisition unit; an image analysis unit configured to compare the first image with the second image and determine whether the vehicle in which the housing is mounted has been changed; and a theft signal output unit configured to output a preset theft occurrence signal based on a determination that the vehicle has been changed by the image analysis unit.

The image analysis unit may be configured to determine whether the vehicle has been changed by comparing a reference region in which the part appears in the first image and a comparison region corresponding to the reference region in the second image.

The comparison region may be set as a region having a location corresponding to a location of the reference region on the first image, on the second image.

The image analysis unit may include a parts identification algorithm set to identify the part based on an image recorded in the image storage unit.

The first image may include a plurality of previous images captured before the second image was captured.

The parts identification algorithm may identify, as the part, a region in which a color-related value maintains a preset difference or less in the different previous images.

Based on restarting of the image acquisition unit, the image analysis unit may be set to determine whether the vehicle has been changed from before the restarting.

Based on the output of the theft occurrence signal, the image acquisition unit may be switched to a function limiting mode in which image capturing is stopped.

The dash cam may further include: transceiver unit configured to transmit the theft occurrence signal to a preset terminal.

The dash cam may further include: a location information recognizing unit built in the housing and determining a location of the housing, The theft occurrence signal may include information on the location of the housing.

In another aspect, an anti-theft system for a dash cam includes: a dash cam mounted inside a vehicle to image a space including at least a portion of a part constituting the vehicle;

an image analysis unit provided to perform wireless communication with the dash cam and configured to determine whether the vehicle in which the dash cam is installed has been changed based on an image captured by the dash cam; and a theft signal output unit configured to output a preset theft occurrence signal based on a determination that the vehicle has been changed by the image analysis unit.

The image analysis unit may determine whether the vehicle has been changed by comparing a pre-stored first image with a second image newly captured by the dash cam.

Other details of the present disclosure are included in the detailed description and drawings.

According to embodiments of the present disclosure, at least the following benefits are provided.

The theft of the dash cam can be prevented.

The location of the stolen dash cam can be identified

The effects according to the present disclosure are not limited by the contents exemplified above, and more various effects are included in the present specification.

DETAILED DESCRIPTION

Advantages and features of the invention and methods to achieve the same are described more fully hereinafter with reference to the accompanying drawings in which embodiments are shown. This invention may, however, be embodied in many different forms and should not be construed as limited to the embodiments set forth herein. Rather, these embodiments are provided so that this disclosure is thorough, and will fully convey the scope of the invention to those skilled in the art and this invention is defined by the scope of the claims.

Figure 1:
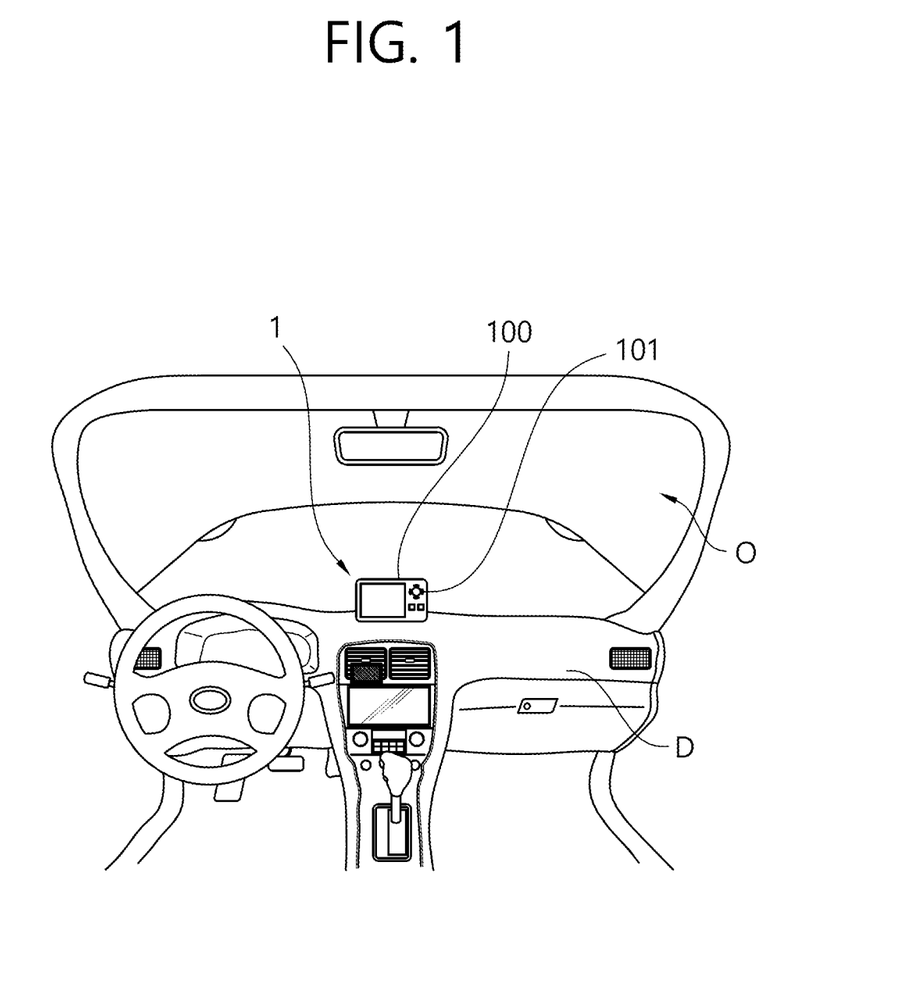
FIG. 1 is a diagram illustrating a state in which a dash cam having an anti-theft function according to an embodiment of the present disclosure is installed inside a vehicle.

Embodiments of this specification invention will be described with reference to cross-sectional and and/or top plan views of the present disclosure. Therefore, a form of the drawings by production technology and/or an allowable error may be changed. In the drawings of the present disclosure, components may be exaggerated or reduced to easily understand for the convenience of description. Throughout the specification, like reference numerals denote the substantially same elements Hereinafter, the present disclosure will be described with reference to drawings to describe a dash cam having an anti-theft function according to an embodiment of the present disclosure. FIG. 1 is a diagram illustrating a state in which a dash cam having an anti-theft function according to an embodiment of the present disclosure is installed inside a vehicle.

As shown in FIG. 1, a dash cam 1 according to an embodiment of the present disclosure may be configured to be installed inside a vehicle. For example, the dash cam 1 may be configured to be easily mounted on a front window, a room mirror, and/or a dashboard D.

To this end, a housing 100 of the dash cam 1 may have a shape to be mounted on the front window, the room mirror, and/or the dashboard D. Alternatively, the housing 100 may be easily detachably formed on a separate bracket structure. In this case, the bracket structure may be installed on the front window, the dashboard, and/or the room mirror of the vehicle.

Meanwhile, when the housing 100 is installed inside the vehicle, an imaging lens exposed to the outside of the housing 100 may be mounted to face a space O outside the vehicle. Here, the vehicle outside space O may refer to a space located in front of a windshield of the vehicle.

In addition, the housing 100 may be mounted so that at least a portion of the parts constituting the vehicle are imaged together by the imaging lens. Accordingly, the dash cam 1 may image a space including an automobile part and the space O outside the vehicle.

For example, the automobile part may be an external frame of the automobile, such as a bonnet, or a part constituting an interior space of the automobile. Parts constituting the interior space of the vehicle may be, for example, an edge frame of the front window, the dashboard D, and/or a cover covering the ceiling. Hereinafter, it is assumed that the vehicle part to be imaged is the dashboard D, but this is only for convenience of description and the present disclosure is not limited thereto.

A switch 101 may be formed in the dash cam 1 to control functions of the dash cam 1 and provide a user interface. The user may manipulate the switch 101 to manage captured images, change items displayed on a screen of the dash cam 1, or change a mode of the dash cam.

Figure 2:
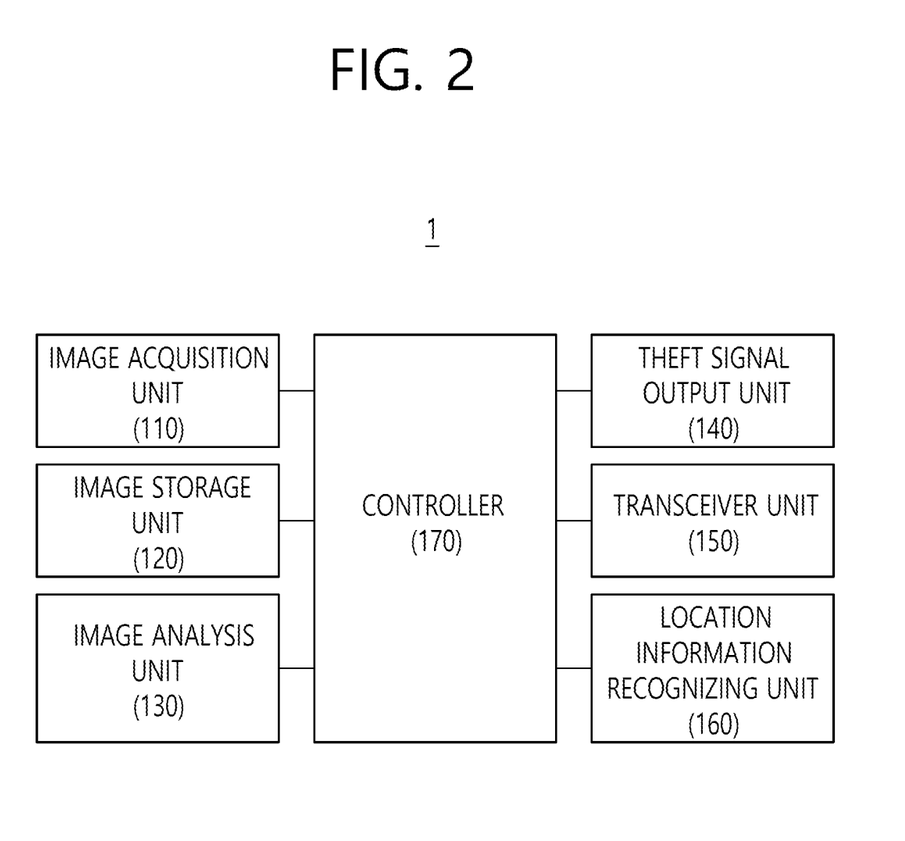
FIG. 2 is a block diagram of a dash cam having an anti-theft function according to an embodiment of the present disclosure.

Hereinafter, a detailed configuration of the dash cam 1 according to an embodiment of the present disclosure will be described with reference to FIG. 2. FIG. 2 is a block diagram of a dash cam having an anti-theft function according to an embodiment of the present disclosure.

As shown in FIG. 2, the dash cam 1 according to an embodiment of the present disclosure may include an image acquisition unit 110, an image storage unit 120, an image analysis unit 130, a theft signal output unit 140, a transceiver unit 150, a location information recognizing unit 160, and a controller 170. The image acquisition unit 110, the image storage unit 120, the image analysis unit 130, theft signal output unit 140, the transceiver unit 150, the location information recognizing unit 160, and the controller 170 may be embedded in the housing 100. For example, the image acquisition unit 110, the image storage unit 120, the image analysis unit 130, the theft signal output unit 140, the transceiver unit 150, the location information recognizing unit 160, and the controller 170 may be implemented by at least one information processing unit and/or a program recorded on a recording medium.

The image acquisition unit 110 may include an imaging lens or the like to capture an image. For example, the image acquisition unit 110 may include an imaging device converting information acquired through a lens into an electrical signal.

The image storage unit 120 may be a recording unit recording images captured by the image acquisition unit 110. The image storage unit 120 may be configured to receive the electrical signal from the imaging device and record the captured image in a preset format.

To this end, the image storage unit 120 may include a recording medium for recording images. For example, the recording medium may be provided as an SD card and may be mounted through a recess formed in the housing 100.

The image analysis unit 130 may determine whether the vehicle in which the housing 100 is mounted has been changed using the images captured by the image acquisition unit 110. The image analysis unit 130 may initiate determination of the change in vehicle based on the restarting of the image acquisition unit 110. More specifically, when the dash cam 1 is switched from an OFF state to an ON state or the image acquisition unit 110 is switched from an OFF state to an ON state, the image analysis unit 130 may determine whether the vehicle has been changed.

At this time, the image analysis unit 130 may determine whether the vehicle has been changed by comparing the image obtained through the image acquisition unit 110 after restarting with the most recent image stored in the image storage unit 120.

In more detail, the image analysis unit 130 may determine whether the vehicle has been changed based on the captured dashboard D. To this end, the image analysis unit 130 may include a parts identification algorithm for identifying parts of the vehicle captured in an image. Details of the parts identification algorithm and vehicle change determination will be described below with reference to FIG. 3.

The theft signal output unit 140 is a component that outputs a theft occurrence signal when the image acquisition unit 110 determines that the vehicle has been changed. The theft occurrence signal may be implemented in various manners to notify the user of information on the theft.

For example, the theft occurrence signal may be implemented as a message informing of theft and may be transmitted by the transceiver unit 150 to be described below. Alternatively, the theft occurrence signal may include a message informing of theft and current location information of the dash cam 1. Alternatively, a separate speaker may be built in the housing 100, and the theft occurrence signal may be a signal that causes the speaker to output a recorded sound.

The transceiver unit 150 may be configured to transmit information on theft to a preset terminal. To this end, the transceiver unit 150 may be formed to perform wireless communication with an external information processing unit. At this time, a terminal receiving the theft occurrence signal may be set in advance through the switch 101, a touch screen, or the like. For example, the user may input his/her mobile phone number and e-mail address, and in this case, the terminal may be a smartphone and a mail server.

The location information recognizing unit 160 may be built in the housing 100 and may determine location information of the housing 100. For example, the location information may be global positioning system (GPS) information, and the location information recognizing unit 160 may include a GPS receiver.

When it is determined that the vehicle has been changed, the location information recognizing unit 160 may transmit location information to the theft signal output unit 140, and the theft signal output unit 140 may output a theft occurrence signal including the location information.

The controller 170 may be a unit that controls components included in the dash cam 1 based on the input of the switch 101 and various signals. Under the control of the controller 170, the dash cam 1 may be switched to an image capture mode, a function limiting mode, a parking mode, and/or a reference region setting mode.

In the image capture mode, the image acquisition unit 110 may capture an image, and the captured image may be stored in the image storage unit 120. In contrast, the function limiting mode may be a mode in which all or some functions of the dash cam 1 are locked. In the function limiting mode, image capturing by the image acquisition unit 110 may be stopped. The parking mode may be a mode executed in a state in which an engine of the vehicle is turned off after driving is finished. For example, the parking mode may be a low power consumption mode. The reference region setting mode will be described below with reference to FIG. 3.

Meanwhile, when an unlocking signal is output, the controller 170 may release the function limiting mode and switch the dash cam 1 back to the image capture mode. The unlocking signal may be output when a preset password is input to the dash cam 1 through the switch 101 or a touch screen. Alternatively, the unlocking signal may be a signal transmitted from a preset terminal. For example, the user may transmit the unlocking signal to the dash cam 1 through an application and/or program linked with the dash cam 1.

Figure 3:
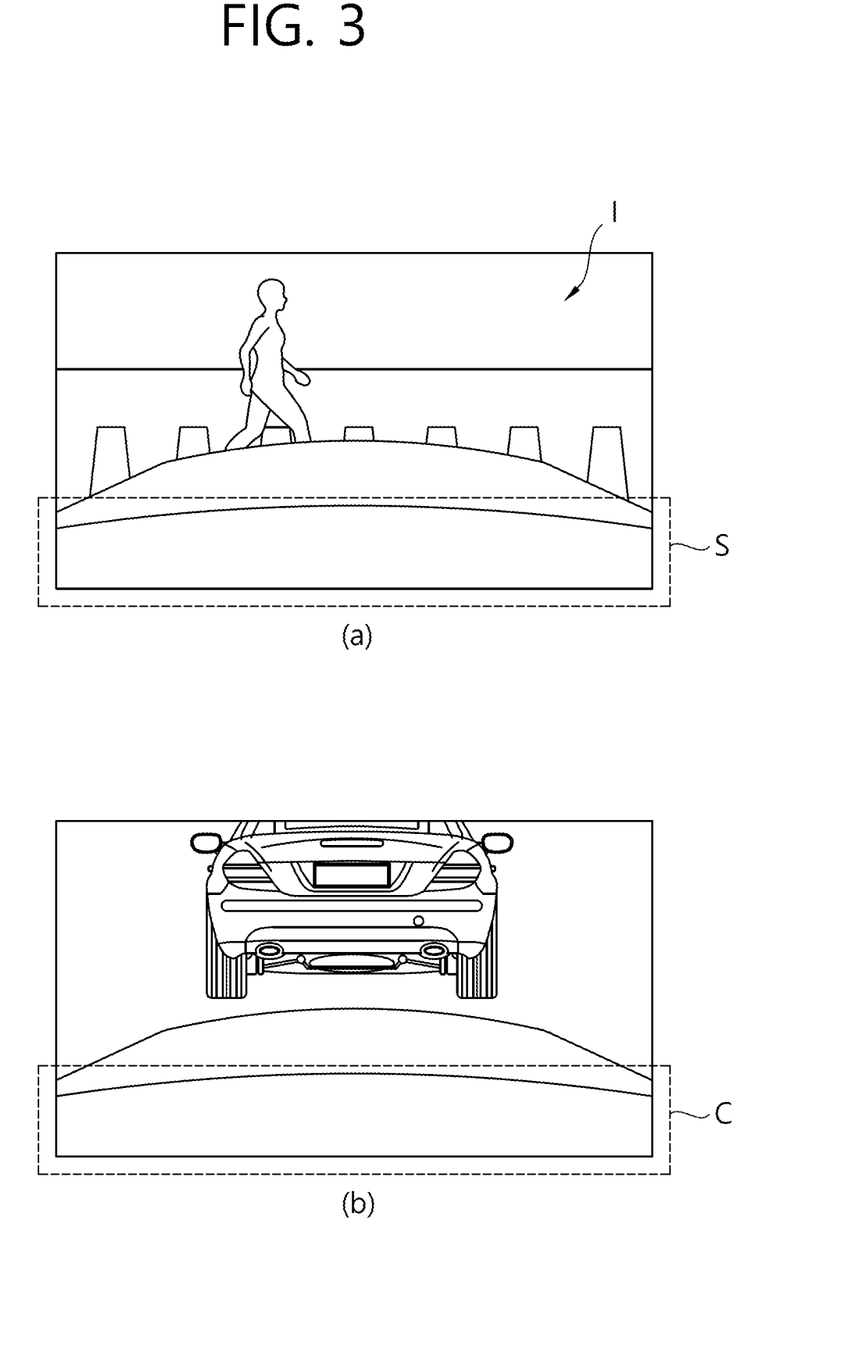
FIG. 3 is an image captured by an image analysis unit schematically expressed for description.

Hereinafter, referring to FIG. 3, a method of determining a change in vehicle by the image analysis unit 130 according to an embodiment of the present disclosure will be described in detail. FIG. 3 is an image captured by the image analysis unit schematically expressed for description. In more detail, FIG. 3(*a*) may be the most recently captured image before restarting, and FIG. 3(*b*) may be a newly captured image.

Hereinafter, a method for setting a reference region S will be described with reference to FIG. 3(*a*), and then a method for determining a change in vehicle will be described with reference to FIGS. 3(*a*) and 3(*b*).

The image analysis unit 130 may identify a reference region S in which the dashboard is captured in a first image in order to determine whether the vehicle has been changed based on the captured image. The reference region S may be a region as a reference for determining a change in vehicle. In contrast, an ignored region I may be a region that does not affect the determination of a change in vehicle, and may be a region other than the reference region S in the image.

For example, the parts identification algorithm may identify the reference region S, which is a region in which the dashboard is located in the first image by using a plurality of previous images included in the first image. Here, the first image may be in the form of a video, and respective previous images may be still images of the first image at different view points. Alternatively, the first image may include at least two of images captured before capturing a second image, and the previous image may be an image selected from the first image.

The parts identification algorithm may distinguish between the reference region S and the ignored region I by using the fact that the reference region S has a smaller change than the ignore region I on a series of images over time. For better understanding, since the ignored region I is a region in which the exterior environment of the vehicle is imaged and recorded, various subjects may appear in and disappear from a series of images. Meanwhile, since the reference region S is a region in which a space corresponding to a vehicle part is imaged, an appearing subject may not change significantly.

For example, the parts identification algorithm may be set to identify a reference region by analyzing a pixel value for each pixel of a plurality of previous images. Here, the pixel value may be a color-related value of pixels constituting the image.

The color-related value may be a numerical value representing RGB format information or HSV format information. In the case of an RGB format, each pixel may be expressed as an R value (0 to 255; red), a G value (0 to 255; green), and a B value (0 to 255; blue). The HSV format may represent each pixel as an H value (0 to 180 or 0 to 360; HUE; color), an S value (0 to 255, saturation), and a V value (0 to 255, value; brightness).

The parts identification algorithm may recognize a region in which a change in pixel value is less than a certain value in a plurality of previous images as an automobile part (dashboard) and may set a corresponding region as a reference region S.

More specifically, the parts identification algorithm may compare pixels located at the same coordinates in a plurality of previous images, and extract coordinates in which a change in pixel value is less than or equal to a predetermined value. When the extracted coordinates are concentrated in a certain region in the previous image, the parts identification algorithm may the certain region as the reference region S.

In this case, the operation of extracting the reference region S may be performed simultaneously when power of the dash cam 1 is turned on. When the reference region is identified, the image analysis unit 130 may store location information on the reference region. For example, the location information may be set to a range of the X axis and the Y axis (refer to FIG. 3).

Meanwhile, in the above example, setting the reference region S using a plurality of previous images has been described as an example, but the present disclosure is not limited thereto.

As another example, the parts identification algorithm may include a deep learning algorithm trained to distinguish between parts in an image. For example, the parts identification algorithm may be provided to identify parts in the most recent image in a semantic segmentation manner. Even in this case, the image analysis unit 130 may store location information on the reference region when the reference region is identified.

Alternatively, as another example, the image analysis unit 130 may be configured to directly receive location information of the reference region S from the user. To this end, the dash cam 1 may provide a reference region setting mode. The reference region setting mode may be entered by operating the switch 101 or by operating an interface provided in the touch screen.

When the reference region setting mode is executed, a list of images recorded in the image storage unit 120 may be displayed on the screen of the dash cam 1. After selecting an image from the list, the user may directly designate a region in which the dashboard is displayed. In this case, the reference region S may be set by the user designating upper and lower points of the reference region S. Alternatively, the reference region S may be set by inputting coordinate information for the upper and lower points.

In this case, the reference region S may be set to a region located between points set by the user. For example, if a y-axis coordinate of the upper point is a and a y-axis coordinate of the lower point is b, the reference region S may be set as a region between an axis in which y=a and an axis in which y=b.

Hereinafter, a method of recognizing whether the vehicle has been changed at a time point at which a second image is captured, after the reference region S is set based on the above description will be described.

When the image acquisition unit 110 or the dash cam 1 is restarted, the image analysis unit 130 may determine whether the vehicle has been changed by comparing the first image (refer to FIG. 3(*a*)) already recorded in the image storage unit 120 and the newly captured second image (refer to FIG. 3(*b*)).

First, the image analysis unit 130 may set a comparison region C by loading stored location information. The comparison region C may be a region corresponding to location information in the second image. For example, after loading the location information, the comparison region C may be set as a set of pixels in the same coordinate range as the reference region S.

When the reference region S and the comparison region C are determined, the image acquisition unit 110 may determine whether the vehicle has been changed by determining image similarity between the two regions. The image similarity may be specifically determined in a histogram method.

The histogram method may be a method using a distribution of pixel values of an image. To this end, the image analysis unit 130 may extract a pixel value distribution (a first histogram) of the reference region S and a pixel value distribution (a second histogram) of the comparison region C. The image analysis unit 130 may determine a similarity of the images by comparing the first histogram and the second histogram.

The first histogram and the second histogram may be two-dimensional (2D) histograms for the reference region S and the comparison region C, respectively. Here, the 2D histograms may be histograms representing the frequency of two variable values.

In order to obtain the first histogram and the second histogram, the image analysis unit 130 may extract HSV pixel value information of pixels for each of the reference region S and comparison region C. The image analysis unit 130 may extract the first histogram based on the H value (0 to 180 or 0 to 360; HUE; color) and the S value (0 to 255, saturation) of the reference region S. In addition, the image analysis unit 130 may extract the second histogram based on the H value (0 to 180 or 0 to 360; HUE; color) and the S value (0 to 255, saturation) of the comparison region C.

After extracting the first histogram and the second histogram, the image analysis unit 130 may normalize each histogram to have a value of 0 to 1. Thereafter, the image analysis unit 130 may calculate a similarity between the first histogram and the second histogram by using intersection. In this case, the similarity may have a value between 0 and 1. As the similarity is close to 0, the both images may not be similar, and as the similarity is close to 1, the both images are similar.

In the above example, the image analysis unit 130 determines the similarity between the first histogram and the second histogram using the intersection method, but the present disclosure is not limited thereto. For example, the image analysis unit 130 may perform calculations using a chi-square method, a bhattacharyya distance method, or the like.

Alternatively, the image analysis unit 130 may include an algorithm configured and/or trained to determine similarity based on pixel value distribution. The algorithm may be set to determine similarity by comparing variance values, most frequent pixel values, and average pixel values of the first histogram and the second histogram.

The image analysis unit 130 may determine that the vehicle has not been changed when the similarity between the reference region S and the comparison region C satisfies a preset reference. If the similarity does not satisfy a preset reference, the image analysis unit 130 may determine that the vehicle has been changed, and a theft occurrence signal may be output.

For example, the preset reference may be a numerical value for the similarity described above. As a specific example, the image analysis unit 130 may determine that both images are similar when an intersected similarity value is 0.8 or more.

Alternatively, the preset reference may be a difference value between the first histogram and the second histogram with respect to at least one of a variance value, a most frequent pixel value, and an average pixel value. In this case, if the difference value is equal to or less than a predetermined value, it may be determined that the similarity is high and it may be determined that the vehicle has not been changed.

Hereinafter, an anti-theft system for a dash cam according to an embodiment of the present disclosure will be described with reference to the above description. For convenience of description, the same reference numerals are used for parts identical or similar to those of the embodiment described above, and descriptions of common parts are omitted.

Figure 4:
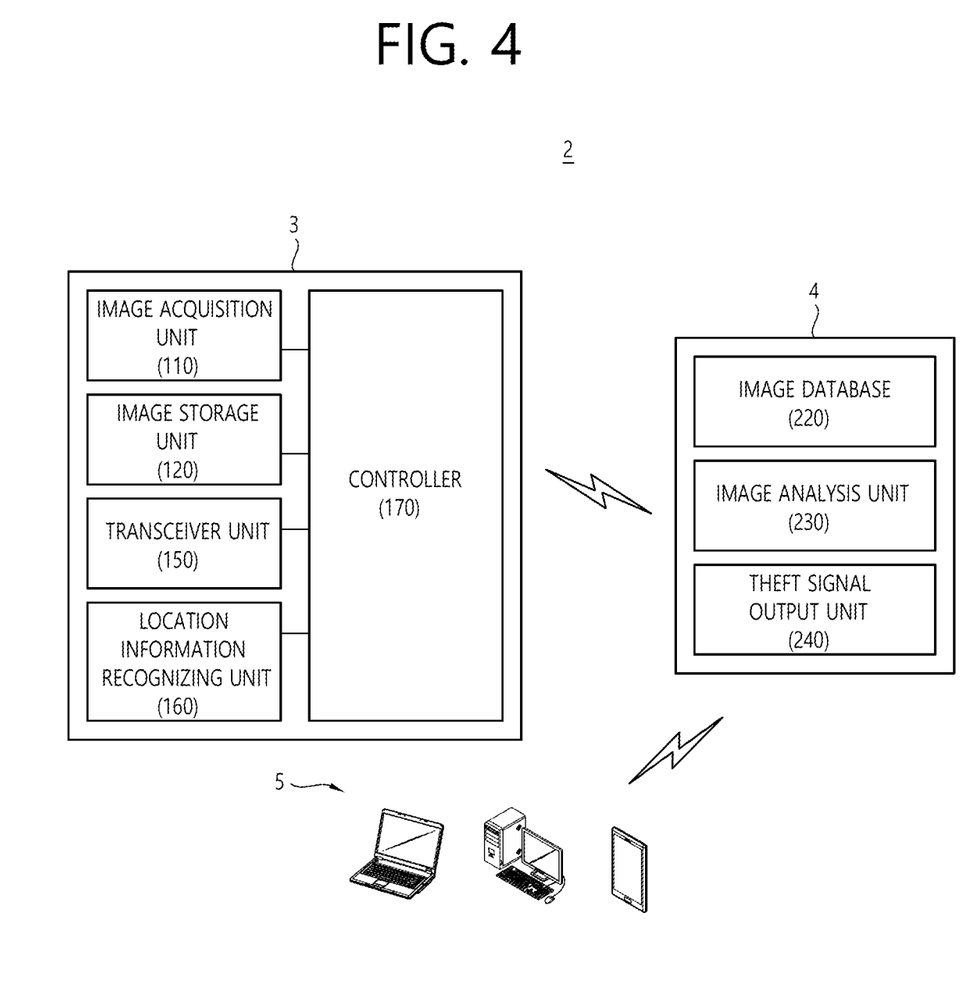
FIG. 4 is a block diagram illustrating an anti-theft system for a dash cam according to an embodiment of the present disclosure.

First, referring to FIG. 4, FIG. 4 is a block diagram illustrating an anti-theft system for a dash cam according to an embodiment of the present disclosure. As shown in FIG. 4, an anti-theft system 2 according to an embodiment of the present disclosure may include a dash cam 3, an image analysis server 4, and a terminal 5.

First, the terminal 5 may be an information processing unit, such as a desktop, a laptop, a smartphone, or a PDA used by a user. The user may access the image analysis server 4 through an Internet homepage or exchange information with the image analysis server 4 through a dedicated program and/or application.

Unlike the embodiment described above, the dash cam 3 according to the present embodiment may not include an image analysis unit and a theft signal output unit. In the present embodiment, the dash cam 3 may transmit a newly captured image together with location information to the image analysis server 4 when restarted.

The image analysis server 4 may be a computing unit capable of wireless communication with the dash cam 3 and the user terminal 5. The image analysis server 4 may include an image analysis unit 230, a theft signal output unit 240, and an image database 220. Here, since the image analysis unit 230 and the theft signal output unit 240 may be formed to be the same as or similar to those of the embodiment described above, only differences thereof will be described below.

The image database 220 may be a database in which a first image, which is a basis for determining whether a vehicle has been changed, is recorded. In the present embodiment, the image analysis server 4 may receive a first image from the user terminal 5 and/or the dash cam 3 in advance and record the same.

For example, after selecting the first image to be used as a basis for comparison, the user transmit the first image to the image analysis server 4 through the user terminal 5. The image analysis server 4 may record the received image in the image database 220. In addition, images transmitted, while the dash cam 3 is restarted, may be recorded in the image database 220.

The image analysis unit 230 may set the image recorded in the image database 220 as the first image which is the basis for comparison, set the newly received image as the second image for determination, and determine whether the vehicle at a time point at which the first image is captured is different from the vehicle at a time point at which the second image is captured.

Here, a reference region may be set similarly to the embodiment described above. However, in the case of the present embodiment, the setting of the reference region by the user may be input through the user terminal 5.

For example, the user may connect to a homepage, program, and/or application, directly upload the first image, and then perform a task of setting coordinates for the reference region. Based on the reference region set by the user, the image analysis unit 230 may determine whether the vehicle has been changed with respect to a new image.

When the image analysis unit 230 determines that the vehicle has been changed, the theft signal output unit 240 may transmit a theft occurrence signal to the user terminal 5. The theft occurrence signal may include text information indicating that the dash cam 3 has been stolen and location information transmitted by the dash cam 3.

While the embodiments have been shown and described, it will be understood by those skilled in the art that various changes in form and details may be made thereto without departing from the spirit and scope of the present disclosure as defined by the appended claims. Therefore, it should be understood that the embodiments described above are just exemplary and not limiting in all aspects. The scope of the present disclosure is defined in the appended claims, and all changes and modifications derived from the claims and their equivalents should be interpreted as being included in the scope of the present disclosure.

Description of Reference Numerals

| | |
|---|---|
| 1, 3: dash cam | 2: anti-theft system |
| 4: image analysis server | 5: terminal |
| 100: housing | 101: switch |
| 110: image acquisition unit | 120: image storage unit |
| 130, 230: image analysis unit | 140, 240: theft signal output unit |
| 150: transceiver unit | 160: location information recognizing unit |
| 170: controller | 170: image database |
| C: comparison region | D: dashboard |
| I: ignored region | O: vehicle outside space |
| S: reference region | |

What is claimed is:

1. A dash cam with an anti-theft function, the dash cam comprising:
an image acquisition unit configured to capture an image;
a housing, in which the image acquisition unit is built in, mounted inside a vehicle so that the image acquisition unit images a space including at least a portion of a part constituting the vehicle;
an image storage unit configured to store a first image and a second image captured by the image acquisition unit;
an image analysis unit configured to compare the first image with the second image and determine whether the vehicle in which the housing is mounted has been changed; and
a theft signal output unit configured to output a preset theft occurrence signal based on a determination that the vehicle has been changed by the image analysis unit,
wherein the image analysis unit is configured to determine whether the vehicle has been changed by comparing a reference region in which the part appears in the first image and a comparison region corresponding to the reference region in the second image,
wherein the image analysis unit includes a parts identification algorithm set to identify the part based on an image recorded in the image storage unit,
wherein the first image includes a plurality of previous images captured before the second image is captured,
wherein the parts identification algorithm identifies, as the part, a region in which a color-related value maintains a preset difference or less in the different previous images, and
wherein, based on the output of the theft occurrence signal, the image acquisition unit is switched to a function limiting mode in which image capturing is stopped.

2. The dash cam of claim 1, wherein the comparison region is set as a region having a location corresponding to a location of the reference region on the first image, on the second image.

3. The dash cam of claim 1, wherein, based on restarting of the image acquisition unit, the image analysis unit is set to determine whether the vehicle has been changed from before the restarting.

4. The dash cam of claim 1, further comprising:
transceiver unit configured to transmit the theft occurrence signal to a preset terminal.

5. The dash cam of claim 4, further comprising:
a location information recognizing unit built in the housing and determining a location of the housing,
wherein the theft occurrence signal includes information on the location of the housing.

6. An anti-theft system for a dash cam, the anti-theft system comprising:
a dash cam mounted inside a vehicle to image a space including at least a portion of a part constituting the vehicle;
an image analysis unit provided to perform wireless communication with the dash cam and configured to determine whether the vehicle in which the dash cam is installed has been changed based on an image captured by the dash cam; and
a theft signal output unit configured to output a preset theft occurrence signal based on a determination that the vehicle has been changed by the image analysis unit,
wherein the image analysis unit determines whether the vehicle has been changed by comparing a pre-stored first image with a second image newly captured by the dash cam, wherein the image analysis unit includes a parts identification algorithm set to identify the part based on an image recorded in the image storage unit, wherein the first image includes a plurality of previous images captured before the second image is captured, wherein the parts identification algorithm identifies, as the part, a region in which a color-related value maintains a preset difference or less in the different previous images, and wherein, based on the output of the theft occurrence signal, the dash cam is switched to a function limiting mode in which image capturing is stopped.

* * * * *